(12) United States Patent
Haswell

(10) Patent No.: US 8,140,860 B2
(45) Date of Patent: Mar. 20, 2012

(54) POLICY-DRIVEN FILE SYSTEM WITH INTEGRATED RAID FUNCTIONALITY

(75) Inventor: Jonathan Haswell, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1832 days.

(21) Appl. No.: 10/737,139

(22) Filed: Dec. 15, 2003

(65) Prior Publication Data

US 2005/0132212 A1      Jun. 16, 2005

(51) Int. Cl.
*G06F 21/00* (2006.01)
(52) U.S. Cl. .................. 713/193; 713/165; 713/167
(58) Field of Classification Search .................. None
See application file for complete search history.

(56) References Cited

U.S. PATENT DOCUMENTS

| | | | |
|---|---|---|---|
| 5,463,776 A * | 10/1995 | Voigt et al. ............................. | 1/1 |
| 5,677,900 A * | 10/1997 | Nishida et al. .................. | 360/13 |
| 5,960,169 A * | 9/1999 | Styczinski ........................ | 714/6 |
| 6,098,128 A * | 8/2000 | Velez-McCaskey et al. ... | 710/65 |
| 6,223,300 B1 * | 4/2001 | Gotoh ............................... | 714/5 |
| 6,330,621 B1 | 12/2001 | Bakke et al. | |
| 6,636,878 B1 * | 10/2003 | Rudoff .......................... | 707/204 |
| 6,742,137 B1 * | 5/2004 | Frey, Jr. ............................. | 714/6 |
| 7,085,819 B2 * | 8/2006 | Bright et al. .................. | 709/217 |
| 2001/0047482 A1 * | 11/2001 | Harris et al. .................. | 713/200 |
| 2002/0152339 A1 * | 10/2002 | Yamamoto ....................... | 710/36 |
| 2004/0158711 A1 * | 8/2004 | Zimmer ......................... | 713/165 |

OTHER PUBLICATIONS

K.S. Amiri, "Scalable and manageable storage systems," Department of Electrical and Computer Engineering, Carnegie Mellon University, CMU-CS-00-178, pp. 54-59, Dec. 2000.
K. Amiri et al., "Dynamic Function Placement in Active Storage Clusters,", School of Computer Science, Carnegie Mellon University, CMU-CS-99-140, Jun. 1999.
J.H. Hartman et al., "The Zebra Striped Network File System," pp. 1-25, 1993.
B.R. Montague, "The Swift/RAID Distributed Transaction Driver," Baskin Center for Computer Engineering & Information Sciences, University of California, Santa Cruz, UCSC-CRL-93-03, Jan. 1, 1993.

* cited by examiner

*Primary Examiner* — Benjamin Lanier
(74) *Attorney, Agent, or Firm* — Joseph P. Curtin; Mohammed Kashef

(57) ABSTRACT

A filing system controls block-level storage and selects a required level of performance and reliability for a file stored on a storage system on a file-by-file basis. A policy manager contains at least one rule relating to a RAID level of protection for a file stored on the storage system and the RAID level of protection is selected from a plurality of RAID levels of protection. At least one rule is based on an access pattern of files stored on storage systems. An access manager provides the policy manager with information relating to access patterns of files stored on the storage system. At least two files can be stored on the storage system having different RAID levels of protection, and at least two files can be stored on a same storage unit of the storage system can have different RAID levels of protection.

12 Claims, 3 Drawing Sheets

POLICY-DRIVEN FILE SYSTEM WITH INTEGRATED RAID FUNCTIONALITY

BACKGROUND OF THE INVENTION

1. Field of the Invention

The present invention relates to data storage subsystems. More particularly, the present invention relates to RAID-protected storage subsystems.

2. Description of the Related Art

Performance of a data storage subsystem is adversely affected by the need to protect data stored in an unreliable storage medium. When a data storage subsystem is formed by an array of storage units, such as Hard Disk Drives (HDDs), a well-known RAID technique is typically used to provide protection.

RAID-configured subsystems are conventionally implemented using block-level controllers that provide RAID-type protection by generating parity information that is based on fixed-sized blocks of data that are received from a host system. A conventional filing system within the host system maps application files into the fixed-sized blocks. From the point of view of the conventional filing system, a RAID controller is effectively invisible and the filing system merely "sees" a storage subsystem that provides reliable block storage. All conventional RAID system configurations, however, suffer from significant system operation inefficiencies when data is written to a RAID-configured storage array. That is, depending on the RAID level of the storage subsystem, a single write operation can turn into two, four, six or more read and write operations on the storage units of the subsystem.

Additionally, while conventional filing systems can have different volumes/file systems that are protected by different RAID levels, such a conventional system configuration is inflexible because in the situation when there is insufficient space on a one of the RAID-configured storage units, another entire storage unit or virtual storage unit must be added to the system so that there is sufficient space that can be associated with the filled RAID-configured storage unit in order to provide the RAID-level protection. Moreover, the inflexibility exists even when other RAID-configured storage units that are already part of the system are only partial filled. Further still, all storage units within a conventional RAID array must be of the same or close to the same effective size. A complete new set of storage units representing the width of the RAID array is required to be added to the array to expand the size of the array.

There is also a known filing system that provides different RAID levels of protection for different files. The known system includes a logical layer between the filing system and the storage devices that implements "Object-Based Disks" (OBD). The known filing system determines which data should be protected by which RAID levels and generates parity information accordingly. The data and parity information is then passed to the OBD layer, which runs an internal filing system that stores the data in logical objects. Thus, the known filing system is essentially a two-level filing system in which the top level filing system handles RAID processing and the lower level filing system the allocation to physical blocks. This provides the flexibility of RAID level by file, but at the expense of the inefficiency of a multi-level system.

Consequently, what is needed is a filing system that reduces the inefficiencies associated with a conventional RAID-configured storage subsystem, or the inefficiencies of a multi-level filing system and yet maintains overall system reliability. Additionally, what is needed is a filing system that selects a required level of performance and reliability for a file on a file-by-file basis.

BRIEF SUMMARY OF THE INVENTION

The present invention provides a filing system that reduces the inefficiencies associated with a conventional RAID-configured storage subsystem and maintains overall system reliability. Additionally, the present invention provides a filing system that selects a required level of performance and reliability for a file on a file-by-file basis.

The advantages of the present invention are provided by a filing system controlling block-level storage on a plurality of storage units, such as hard disk drives, random access memory devices and/or optical drives. The filing system includes a policy manager and an access manager. The policy manager contains at least one rule relating to block-level storage for a RAID level of protection for a file stored on the plurality of storage units. The RAID level of protection is selected from a plurality of RAID levels of protection, and at least one rule contained in the policy manager is based on an access pattern of files stored on the plurality of storage units. The selected RAID level of protection can be further based on a size of the file and/or contents of the file. According to the invention, at least two files can be stored on the plurality of storage units having different RAID levels of protection. Additionally or alternatively, at least two files stored on a same storage unit can have different RAID levels of protection. Moreover, the RAID stripe size can be dynamically adjusted to match a filing system stripe and segment size. The access manager provides the policy manager with information relating to access patterns of files stored on the plurality of storage units. The information relating to access patterns of files is used for determining at least one RAID stripe size and/or for write coalescing data for storage on the plurality of storage units. The filing system can also include a RAID manager that is responsive to a rule contained in the policy manager by implementing the selected RAID level of protection for a file, and a RAID engine that is response to the RAID manager by generating RAID redundancy-type information for the file. A space manager contains availability information for each storage block on the plurality of storage units.

The present invention also provides a method of creating a file on a storage subsystem having a plurality of storage units. A request to create a file on the plurality of storage units is received and a policy manager is queried for at least one rule relating to block-level storage for a RAID level of protection for the file created on the plurality of storage units. The RAID level of protection is selected from a plurality of RAID levels of protection, and at least one rule contained in the policy manager is based on an access pattern of files stored on the plurality of storage unit. The file is written to the plurality of storage units based on the RAID level of protection selected for the file.

The present invention further provides a method of writing a file on a storage subsystem having a plurality of storage units. When it is determined that a file stored on the plurality of storage units should be updated, a policy manager is queried for at least one rule relating to block-level storage for a RAID level of protection for the file stored on the plurality of storage units. The RAID level of protection is selected from a plurality of RAID levels of protection, and at least one rule contained in the policy manager is based on an access pattern of files stored on the plurality of storage units. The file is written to the plurality of storage units based on the RAID level of protection selected for the file either at the same place on the plurality of storage units that the file was located before the writing based on the selected RAID level of protection or at a different location on the plurality of storage units based on the selected RAID level of protection. Information relating to access patterns of files stored on the plurality of storage units is also provided to the policy manager.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a single level write-anywhere-type of log filing system that directly controls the RAID functionality of a storage subsystem while reducing the inefficiencies associated with a conventional block level RAID-configured storage subsystem and maintaining overall system reliability. The particular RAID level protection, i.e., RAID 0, RAID 1, RAID 5, RAID 6, etc., that is selected for a file for a required level of performance and reliability is determined on a file-by-file basis at the filing system level using a policy manager that is part of the filing system. Implementation of a particular RAID level is optimized by the present invention based on the file size and other characteristics of the file, such as, but not limited to, the type of data contained in the file and the way the file will be accessed. Information relating to how a file is protected and where data and parity relating to the protected file are stored as metadata, which may be similarly protected as if the metadata was a file.

The constraint associated with a conventional filing system that an entire RAID protected storage unit or a virtual storage unit must be added to the system so that there is sufficient space when there is insufficient space on one of the RAID-configured storage units in order to provide the RAID-level protection is eliminated by a filing system of the present invention because data protected by different RAID levels can be mixed, or combined, on a single storage unit or set of storage units. Storage subsystem performance can be further enhanced because the present invention dynamically adjusts the RAID stripe size to match the log filing system stripe and segment size. Moreover, all of parameters associated with different levels of RAID protection can be continuously varied by the present invention to match the size of write commands that are received in view of expected read access patterns. In contrast, such parameters are fixed at system initialization for conventional RAID systems.

The restriction associated with conventional RAID configurations that all storage units within a RAID array must be of the same or close to the same effective size is also eliminated by the present invention because the present invention can utilize whatever space is available on the storage units that are attached to the filing system, with the only constraint that particular levels of RAID protection become unavailable as space is exhausted on some of the storage units. Additionally, the requirement that a complete new set of storage units representing the width of the RAID array must be added to a conventionally configured RAID system is eliminated because a filing system of the present invention can use whatever storage units that are available, as long as sufficient space is available on a sufficient number of storage units for the operation requested by a host system.

Figure 1:
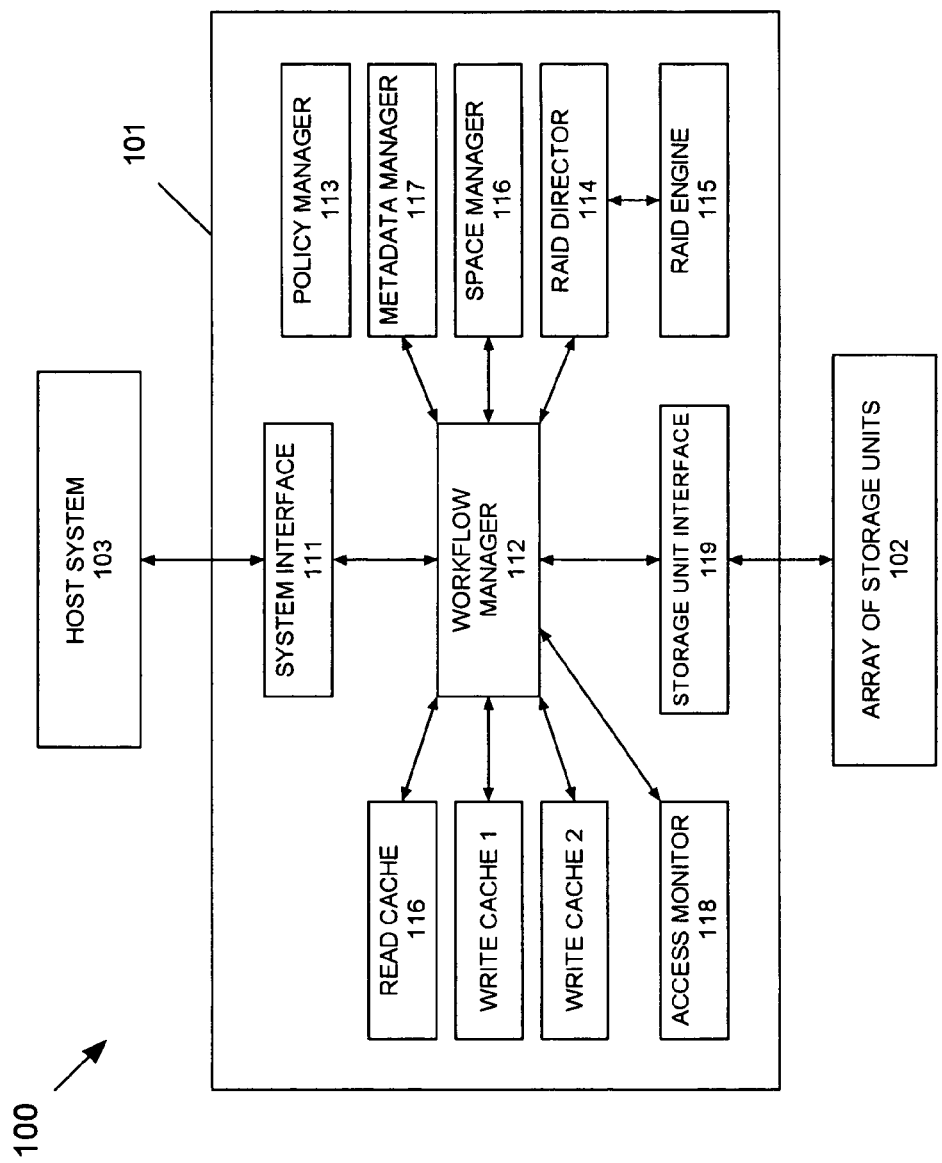
FIG. 1 shows a functional block diagram of a single layer filing system according to the present invention.

FIG. 1 shows a functional block diagram of a storage subsystem 100 having a single layer filing system 101 according to the present invention and an array 102 of storage units. Filing system 101 includes a system interface 111 that is coupled to a workflow manager 112, a policy manager 113, a RAID director 114, a RAID engine 115, a write cache 1, a write cache 2, a read cache 116, a metadata manager 117, an access monitor 118 and a storage unit manager 119. Filing system 101 is coupled to a host system 103. The storage units of array 102 can be a plurality of HDD storage units or other types of memory devices, such as Random Access Memory (RAM) storage devices (both volatile and non-volatile), optical storage devices, and tape storage devices.

Filing system 101 can be implemented as an installable filing system on Unix or other equivalent platform. System interface 111 is preferably configured as executable instructions and receives commands from a host system 103 to read or write data, update inodes, and to perform other functions. An exemplary interface that is suitable for system interface 111 is a Linux-based Virtual File System (VFS). Workflow manager 112 sequences commands through the filing system 101, accessing the appropriate filing system components as required. Policy manager 113 includes a set of user-defined rules relating to how files should be stored at a block level. Additionally or alternatively, policy manager 113 includes a set of self-defined rules relating to how files should be stored at a block level. When workflow manager 112 receives a file create command from host system 103, workflow manager 112 queries policy manager 113 for determining how the newly created file should be stored on storage units 102 at a block level.

RAID director 114 implements the RAID functionality for a file based on responses received from policy manager 113 relating to a required RAID level. Based on the required RAID level, RAID director 114 determines which storage units to use for storing the data and the parity and/or other codes that must be generated. Part of the responsibility of RAID director 114, in association with policy manager 113, is determining the size of writes to storage units 102, tuning storage units 102 to the files being written and also adjusting the RAID characteristics of the file storing the log to optimize system performance. RAID director 114 is coupled to RAID engine 115, which generates redundancy-type information, such as by performing XOR operations or other such algorithms, based on the data for the required RAID level. As an alternative configuration of filing system 101, the implementation of a particular RAID scheme, such as generation of parity may or may not be implemented within filing system 101. That is, RAID director 114 and RAID engine 115 can be components that are separate from, but interface with filing system 101. When the RAID scheme is not implemented within filing system 101, filing system 101 send commands to a RAID director and RAID engine. The decisions on what to protect via RAID, however, are made by filing system 101.

Read cache 116 stores data that has been requested by an application, in addition to data that is required by RAID engine 115 for generating parity-type information. Write cache 1 is configured as a classic write cache that receives data from an application and stores the data until storage units 102 are ready to receive the data. Write cache 1 signals to the application that a write operation is complete prior to the write to storage units 102 actually occurring. Write cache 1 may be physically embodied as ordinary RAM for non-mission-critical systems or physically embodied as some form of Non-Volatile RAM (NVRAM) for applications that are more critical. Write cache 2 stores data that is to be written to storage units 102 after the data has been processed by RAID engine 115 and includes parity data, as well as user data. Similar to write cache 1, write cache 2 may be physically embodied as ordinary RAM for non-mission-critical systems or physically embodied as some form of NVRAM for applications that are more critical.

Space manager 116 manages the files that contain information relating to free space that is available in the data storage subsystem and is queried when new space is required for creating new files or for updating existing files. Space manager 116 contains information for all the storage units attached to the data storage subsystem. Metadata manager 117 manages generation and updating of inodes or similar control structures. Access monitor 118 monitors the type of access patterns being made to data that is already stored in the data storage subsystem and provides feedback to policy manager 113 to help policy manager 113 determine stripe sizes and write coalescing that improves overall system performance. Device interface 119 handles actually sending commands to storage units for actually reading and writing blocks of data from the storage units.

Filing system 101, under the guidance of the policy manager, can determine what level of RAID protection is needed for individual files. For example, temporary files might not be protected by RAID, while database files might be protected by RAID 6, etc. This improves overall system performance by eliminating the additional operations required to provide RAID protection for files that do not require such protection. The present invention also enables very high levels of RAID protection to be applied to critical data, so that fewer compromises regarding reliability are made.

The blocks of storage contained in storage units 102 that are available are utilized by filing system 101 as one of five different categories of storage blocks, at any point in time. The first category of storage blocks is configured as a file containing inodes, i.e., control information for files. Information contained within each inode includes the RAID level applied to the file, the stripe size, the locations for the data of the file in terms of block numbers/storage units, and locations of parity information for the file in terms of block numbers/storage units, if any. The second category of storage blocks is configured as a file containing lists of data blocks in the filing system and whether each respective data block is currently in use or is available. Within the file containing the list of data blocks in the system and whether the data blocks are in use, the normal simple bitmap indicating whether a data block is in-use or is available is replaced by a counter for each block. The counter is used to indicate the number of files that require this block, either because the block stores the data for a file or is required in the parity calculation that would be required to rebuild another file.

The third category of storage blocks is configured as a file containing a list of all of the Modes in the Mode file and whether each respective Mode is currently in use or is available. The fourth category of storage blocks is configured as data blocks that are currently holding customer data. The fifth category of storage blocks is configured as data blocks that are currently unused.

Figure 2:
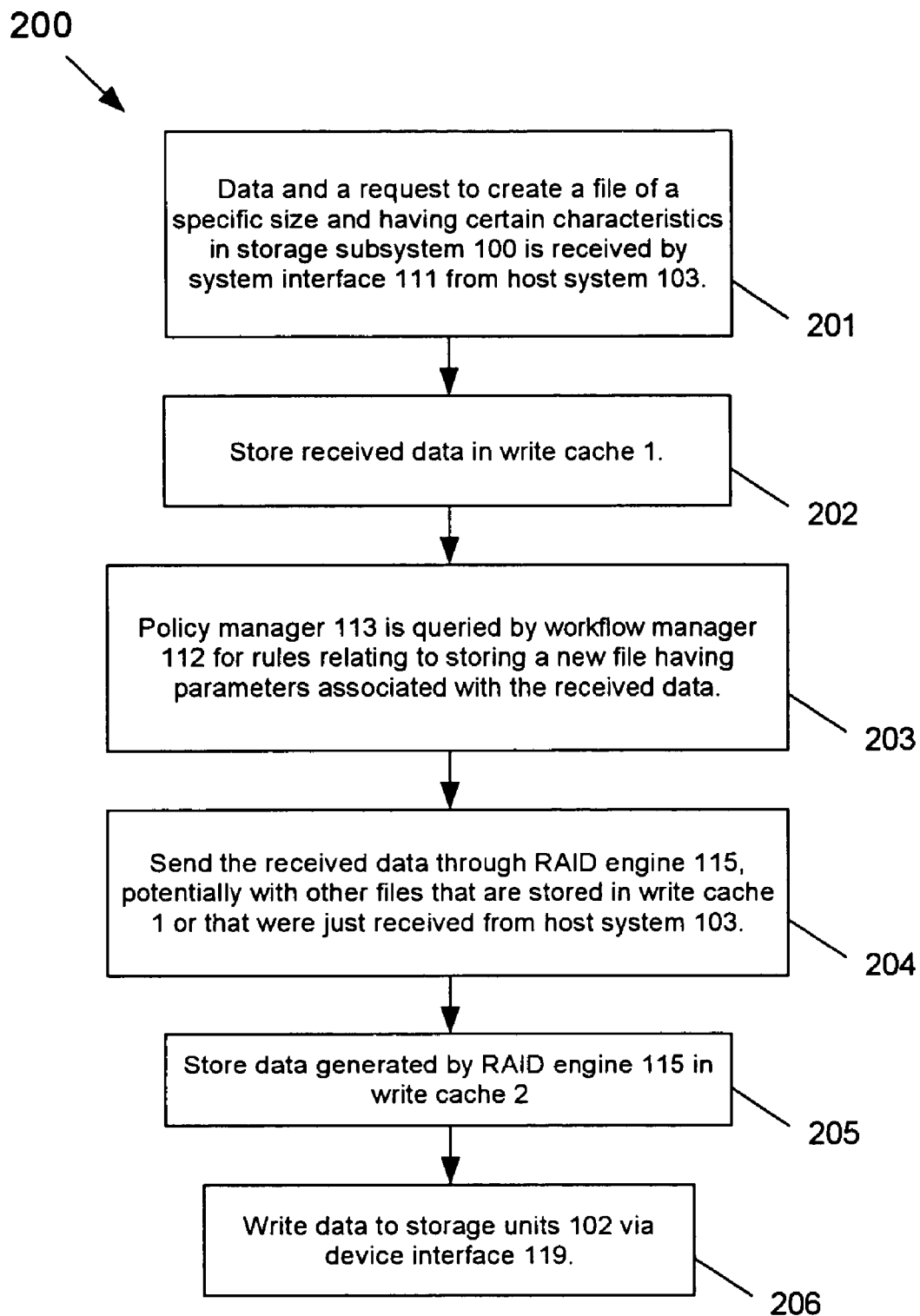
FIG. 2 shows a flow diagram illustrating a file create operation according to the present invention.

FIG. 2 shows a flow diagram 200 illustrating a file create operation according to the present invention. At step 201, data and a request to create a file of a specific size and having certain characteristics in storage subsystem 100 is received by system interface 111 from host system 103. At step 202, the received data is stored in write cache 1. At step 203, workflow manager 112 determines how the file should be written to storage units 102 by querying policy manager 113 for rules relating to storing a new file having parameters associated with the received data. In response, policy manager 113 provides block-level rules and/or information relating to whether the received data should be protected by a specific RAID level and/or whether the data should be coalesced with other commands before being actually written to storage units 102. If, based on the response of policy manager 113, or other sources, workflow manager 112 determines that the received data is not to be written to storage units 102 yet, the data remains in write cache 1 until it is determined that the data should be written to storage units 102. When it is determined that the data is to be written to storage units 102, flow continues to step 204 where the data is sent through RAID engine 115, potentially with other files that are stored in write cache 1, or have been read from the media for the purpose, or that were just received from host system 103. At step 205, the data generated by RAID engine 115 is stored in write cache 2. The data stored in write cache 2 includes the original data and parity data organized by storage unit and block ranges that the data will be written to within storage units 102. The storage units and block ranges to which the data will be written are selected by space manager 116 and recorded by metadata manager 117. At step 206, when the data in write cache 2 is ready to be written to storage units 102, the data is written to storage units 102 via device interface 119.

Figure 3:
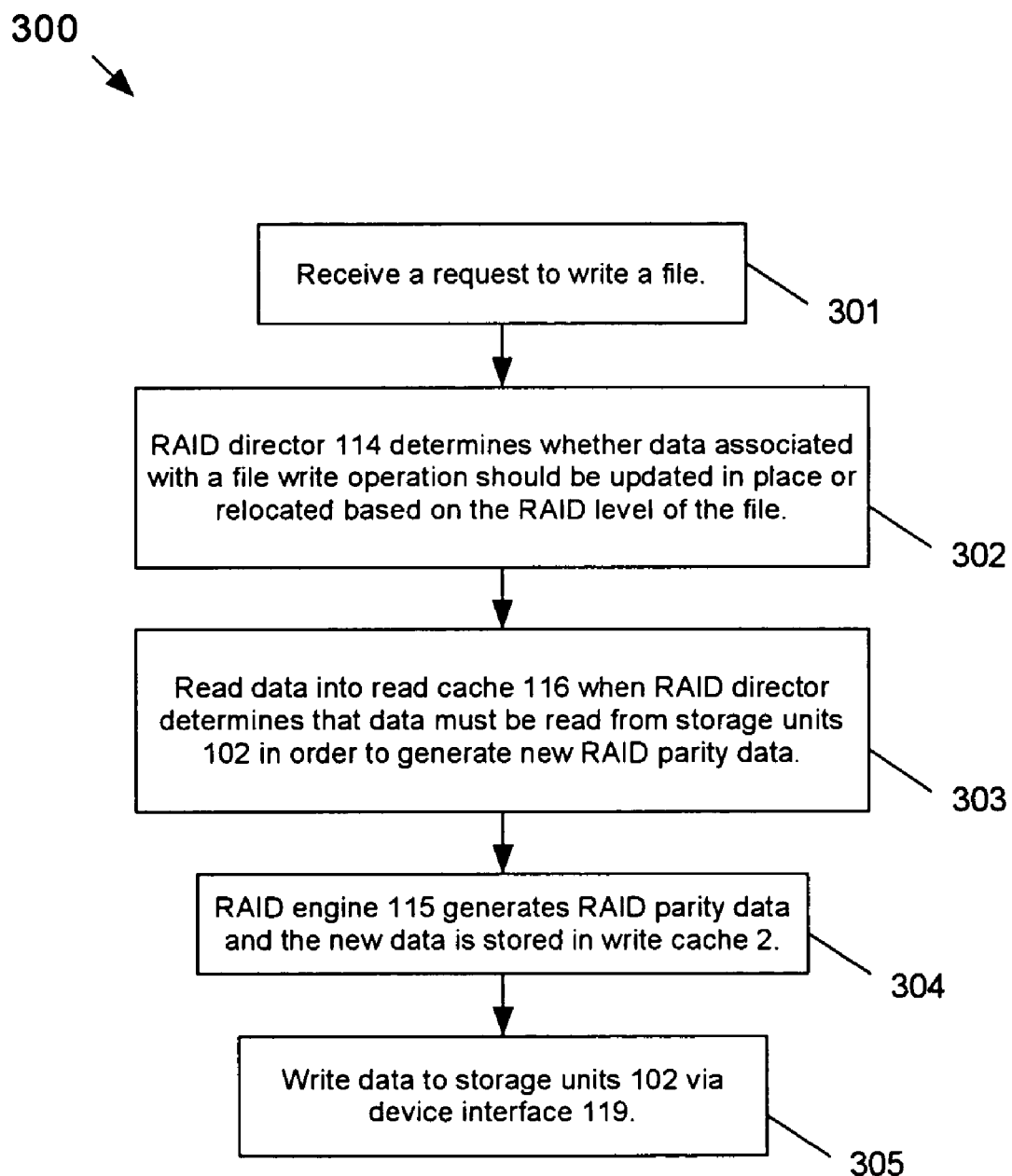
FIG. 3 shows s a flow diagram illustrating a file write operation according to the present invention.

FIG. 3 shows s a flow diagram 300 illustrating a file write operation according to the present invention. A file write operation is similar in many respects to a file create operation. At step 301, a request to write a file is received by system interface 111 from host system 103. At step 302, RAID director 114 determines whether the data associated with a file write operation should be updated in place or relocated based on the RAID level of the file and other factors. When RAID director 114 determines that data must be read from storage units 102 in order to generate new RAID parity data, the data is read into read cache 116 at step 303. At step 304, RAID engine 115 then generates RAID parity data and the new data is stored in write cache 2. The data stored in write cache 2 includes the original data and parity data organized by storage unit and block ranges that the data will be written to within storage units 102. The storage units and block ranges to which the data will be written are selected by space manager 116 and recorded by metadata manager 117. At step 305, the data stored in write cache 2 is written to storage units 102 via device interface 119.

A file read operation performed by filing system 100 is similar to a file read operation performed by a conventional file system, except that filing system 100 may directly issue multiple read commands to the storage units depending on how the data is striped across the storage units.

Filing system 100 can also include a cleaner daemon for reordering data after sections of the file system become fragmented. Additionally, the cleaner daemon can clean up partially used RAID stripes. For example, consider a situation in which several discrete files are stored in a single RAID stripe. After several of the files have been deleted, the RAID stripe is only partially full. The daemon can coalesce the data in the partially full RAID strip with data from another RAID stripe and rewritten, thereby making unused space available. Alternatively, cleaner daemon operation can be delayed until a new set of write commands are received by filing system 100, thereby avoiding extra disk activity. An additional daemon-type function can be provided for scanning the filing system and re-laying out data that is not stored in an optimal manner, based on subsequent read versus write update patterns, for example, by changing the RAID stripe size.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A file system for managing a storage subsystem's RAID functionality such that files stored in the storage subsystem may have different RAID levels of protection thereby optimizing utilization of storage subsystem's storage units, the storage subsystem comprising a plurality of hard disk drive storage units organized in an array, the file system comprising:
   a system interface that receives I/O requests from a host system for the storage subsystem;
   a first write cache that buffers data received by the system interface for a file to be stored by the file system in the storage system;
   a policy manager that is queried by the file system to determine how a file should be written to the storage system and is configured with block-level rules for determining a RAID level of protection for data of said file wherein the file system is configured as a write anywhere log structured filing system of the storage system and is configured to store data of files having different RAID levels on the same storage unit or set of storage units;
   a workflow manager that issues commands throughout the file system and that queries the policy manager for rules (among said rules) relating to storing a new file having parameters associated with data of said file and determine whether said file should be protected by a RAID level, and if said file should be protected by a RAID level then determines a particular RAID level for how data of said file should be written to the storage units;
   a RAID director that implements RAID functionality for said file (based on the determined RAID level) and determines to store data of said file: storage units to use, parity codes to be generated, and the block-level size of write operations to the storage subsystem;
   a RAID engine that processes data of said file using said parity codes to generate RAID parity data based on the determined RAID level;
   a second write cache that buffers the received data of said file, block ranges of storage units the received data will be written to, and said information generated by the RAID engine;
   a space manager that contains storage availability information for each storage block in the storage system and selects block ranges for storing data of said file or for updating a stored file; and
   an access manager that monitors types of access patterns being made to data of files stored in the storage subsystem and provides the policy manager with access pattern information for data of said stored files thereby allowing the policy manager to improve the storage subsystem's performance, by the access manager determining what: (i) RAID stripe size can be changed to match the log structured filing system's stripe and segment sizes, and be continuously varied to match a size of write commands being received instead of an expected read access pattern, and (ii) write coalescing to re-organize data of said files stored.

2. The file system of claim 1, wherein: in response to a file system request to write data to a file already created, the RAID manager determines if write data should be updated in place or relocated based on the created file's RAID level.

3. The file system of claim 1, wherein the RAID director adjusts the RAID characteristics of a file storing a log of said write anywhere log structured filing system, said adjusting to optimize the storage subsystem's performance.

4. The file system of claim 3, wherein said RAID characteristics are selected from the group consisting of: unprotected, mirrored, mirrored N ways, RAID level, and RAID stripe size.

5. The file system of claim 1, further comprising:
   a metadata manager that manages generation and updating: (i) of inodes contained in a first file, the inodes describe information of files stored in the storage subsystem, the information of files comprising: a RAID level applied to data of a stored file, a stripe size of data of a stored file, block locations for data of a stored file, and block locations of parity data for a stored file, and (ii) a second file that contains a listing of stored data blocks and an indicator of whether the stored data blocks are in use, the second file using a counter for each of the stored data blocks, wherein each data block is either used to store data for a file or for parity calculation to rebuild a stored file.

6. The file system of claim 1, further comprising:
   a device interface that issues file read and/or write storage commands to the storage units.

7. The file system of claim 1, wherein the block-level rules are based on a size of a file to be stored by the file system.

8. The file system of claim 1, wherein the block-level rules are based on contents of data of a file to be stored by the file system.

9. The file system of claim 3, further comprising:
   a cleaner deamon that reorders data if sections of said file storing said log become fragmented.

10. The file system of claim 9, where the cleaner deamon cleans up partially used RAID stripes, if at least two discrete files are stored in a single RAID stripe and after at least one of the discrete files is deleted such that the RAID stripe is only part full and can be coalesced with data from another RAID stripe and rewritten, thereby creating additional available storage in the storage subsystem.

11. The file system of claim 1, wherein the RAID level is selected from the group consisting of: RAID 0, RAID 1, RAID 5, and RAID 6.

12. The file system of claim 1, wherein the block-level rules are based on a name of a file to be stored by the file system and a location of the file (to be stored) in a name space of the file system.

* * * * *